US009996712B2

(12) United States Patent
Sundaram et al.

(10) Patent No.: US 9,996,712 B2
(45) Date of Patent: Jun. 12, 2018

(54) SELF TEST DEVICE AND METHOD FOR WIRELESS SENSOR READER

(71) Applicant: Endotronix, Inc., Woodridge, IL (US)

(72) Inventors: Balamurugan Sundaram, Woodridge, IL (US); Michael Nagy, Lawrenceville, GA (US); Douglas Nielsen, Chicago, IL (US); Suresh Sundaram, Woodridge, IL (US)

(73) Assignee: Endotronix, Inc., Woodridge, IL (US)

( * ) Notice: Subject to any disclaimer, the term of this patent is extended or adjusted under 35 U.S.C. 154(b) by 19 days.

(21) Appl. No.: 14/842,973

(22) Filed: Sep. 2, 2015

(65) Prior Publication Data
US 2017/0061168 A1    Mar. 2, 2017

(51) Int. Cl.
*G06K 7/00* (2006.01)
*H04Q 9/00* (2006.01)

(52) U.S. Cl.
CPC ............ *G06K 7/0095* (2013.01); *H04Q 9/00* (2013.01); *H04Q 2209/823* (2013.01); *H04Q 2209/86* (2013.01); *H04Q 2209/88* (2013.01)

(58) Field of Classification Search
CPC ... A61B 5/0031; A61B 5/0215; A61B 5/6882; G06K 7/0008; G06K 2017/0074; G06K 2017/0051
See application file for complete search history.

(56) References Cited

U.S. PATENT DOCUMENTS

| 3,714,595 A | 1/1973 | Denenberg et al. |
| 3,888,708 A | 6/1975 | Wise et al. |
| 3,943,915 A | 3/1976 | Severson |

(Continued)

FOREIGN PATENT DOCUMENTS

| CN | 101116322 | 1/2008 |
| HK | 1147906 | 8/2011 |

(Continued)

OTHER PUBLICATIONS

Extended European Search Report, Endotronix, Inc., Application No. 10762085.8-2319/2417590, dated Jan. 4, 2013.

(Continued)

*Primary Examiner* — Nabil Syed
(74) *Attorney, Agent, or Firm* — McDonald Hopkins LLC (57) ABSTRACT

Disclosed is a self-test device and method for assessing the functional performance of a reader device that is configured to interface with a wireless sensor. The self-test device may be configured to analyze the accuracy of a signal transmitted from the reader device or the accuracy of a signal received by the reader device. In one embodiment, the reader device may be configured to engage the self-test device to allow the reader to transmit a signal, such as a short pulse of energy or a short burst of radio frequency energy to cause the self-test device to output a resonant signal. The self-test device may receive the transmit signal from the reader and evaluate it against predetermined values. The evaluated signals may be used to assess the accuracy of the transmit signal of the reader device to identify potential calibration issues and initiate remedial action by an automated system or human intervention if needed. The self-test device may be built into a docking station where the reader is placed when not in use.

58 Claims, 4 Drawing Sheets

(56) References Cited

U.S. PATENT DOCUMENTS

| | | |
|---|---|---|
| 4,023,562 A | 5/1977 | Hynecek et al. |
| 4,026,276 A | 5/1977 | Chubbuck |
| 4,037,324 A | 7/1977 | Andreasen |
| 4,067,235 A | 1/1978 | Markland et al. |
| 4,127,110 A | 11/1978 | Bullara |
| 4,206,762 A | 6/1980 | Cosman |
| 4,385,636 A | 5/1983 | Cosman |
| 4,407,296 A | 10/1983 | Anderson |
| 4,485,813 A | 12/1984 | Anderson et al. |
| 4,511,858 A | 4/1985 | Charavit et al. |
| 4,531,526 A | 7/1985 | Genest |
| 4,567,459 A | 1/1986 | Folger |
| 4,644,420 A | 2/1987 | Buchan |
| 4,815,472 A | 3/1989 | Wise et al. |
| 4,881,410 A | 11/1989 | Wise et al. |
| 4,953,387 A | 9/1990 | Johnson et al. |
| 4,966,034 A | 10/1990 | Bock et al. |
| 5,005,577 A | 4/1991 | Frenkel |
| 5,006,819 A | 4/1991 | Buchan et al. |
| 5,013,396 A | 5/1991 | Wise et al. |
| 5,046,497 A | 9/1991 | Millar |
| 5,055,838 A | 10/1991 | Wise et al. |
| 5,059,543 A | 10/1991 | Wise et al. |
| 5,108,420 A | 4/1992 | Marks |
| 5,113,868 A | 5/1992 | Wise et al. |
| 5,257,630 A | 11/1993 | Broitman et al. |
| 5,262,127 A | 11/1993 | Wise et al. |
| 5,282,827 A | 2/1994 | Kensey et al. |
| 5,296,255 A | 3/1994 | Gland et al. |
| 5,334,952 A | 8/1994 | Maddy et al. |
| 5,343,064 A | 8/1994 | Spangler et al. |
| 5,377,524 A | 1/1995 | Wise et al. |
| 5,417,235 A | 5/1995 | Wise et al. |
| 5,564,434 A | 10/1996 | Halperin et al. |
| 5,581,248 A | 12/1996 | Spillman, Jr. et al. |
| 5,690,674 A | 11/1997 | Diaz |
| 5,872,520 A | 2/1999 | Seifert et al. |
| 5,920,233 A | 7/1999 | Denny |
| 5,992,769 A | 11/1999 | Wise et al. |
| 6,015,386 A | 1/2000 | Kensey et al. |
| 6,025,725 A | 2/2000 | Gershenfeld et al. |
| 6,109,113 A | 8/2000 | Chavan et al. |
| 6,111,520 A | 8/2000 | Allen et al. |
| 6,126,675 A | 10/2000 | Shchervinsky et al. |
| 6,140,144 A | 10/2000 | Najafi et al. |
| 6,174,322 B1 | 1/2001 | Schneidt |
| 6,190,400 B1 | 2/2001 | Van De Moer et al. |
| 6,206,835 B1 | 3/2001 | Spillman, Jr. et al. |
| 6,232,150 B1 | 5/2001 | Lin et al. |
| 6,278,379 B1 | 8/2001 | Allen et al. |
| 6,287,256 B1 | 9/2001 | Park et al. |
| 6,309,350 B1 | 10/2001 | VanTassel et al. |
| 6,331,163 B1 | 11/2001 | Kaplan |
| 6,338,284 B1 | 1/2002 | Najafi et al. |
| 6,359,444 B1 | 3/2002 | Grimes |
| 6,447,449 B1 | 9/2002 | Fleischman et al. |
| 6,454,720 B1 | 9/2002 | Clerc et al. |
| 6,471,656 B1 | 10/2002 | Shalman et al. |
| 6,477,901 B1 | 11/2002 | Tadigadapa et al. |
| 6,499,354 B1 | 12/2002 | Najafi et al. |
| 6,570,457 B2 | 5/2003 | Fischer |
| 6,592,608 B2 | 7/2003 | Fisher et al. |
| 6,636,769 B2 | 10/2003 | Govari et al. |
| 6,645,143 B2 | 11/2003 | VanTassel et al. |
| 6,647,778 B2 | 11/2003 | Sparks |
| 6,658,300 B2 | 12/2003 | Govari et al. |
| 6,666,826 B2 | 12/2003 | Salo et al. |
| 6,667,725 B1 | 12/2003 | Simons et al. |
| 6,680,654 B2 | 1/2004 | Fischer et al. |
| 6,682,490 B2 | 1/2004 | Roy et al. |
| 6,713,828 B1 | 3/2004 | Chavan et al. |
| 6,749,622 B2 | 6/2004 | McGuckin, Jr. et al. |
| 6,764,446 B2 | 7/2004 | Wolinsky et al. |
| 6,779,406 B1 | 8/2004 | Kuzina et al. |
| 6,783,499 B2 | 8/2004 | Schwartz |
| 6,824,521 B2 | 11/2004 | Rich et al. |
| 6,838,640 B2 | 1/2005 | Wise et al. |
| 6,844,213 B2 | 1/2005 | Sparks |
| 6,855,115 B2 | 2/2005 | Fonesca et al. |
| 6,890,300 B2 | 5/2005 | Lloyd et al. |
| 6,893,885 B2 | 5/2005 | Lemmerhirt et al. |
| 6,916,310 B2 | 7/2005 | Sommerich |
| 6,923,625 B2 | 8/2005 | Sparks |
| 6,926,670 B2 | 8/2005 | Rich et al. |
| 6,932,114 B2 | 8/2005 | Sparks |
| 6,935,010 B2 | 8/2005 | Tadigadpa et al. |
| 6,939,299 B1 | 9/2005 | Peterson et al. |
| 6,959,608 B2 | 11/2005 | Bly et al. |
| 6,968,743 B2 | 11/2005 | Rich et al. |
| 6,981,958 B1 | 1/2006 | Gharib et al. |
| 7,001,398 B2 | 2/2006 | Carley et al. |
| 7,004,015 B2 | 2/2006 | Chang-Chien et al. |
| 7,013,734 B2 | 3/2006 | Zdeblick et al. |
| 7,025,727 B2 | 4/2006 | Brockway et al. |
| 7,028,550 B2 | 4/2006 | Zdeblick et al. |
| 7,048,756 B2 | 5/2006 | Eggers et al. |
| 7,059,176 B2 | 6/2006 | Sparks |
| 7,059,195 B1 | 6/2006 | Liu et al. |
| 7,066,031 B2 | 6/2006 | Zdeblick et al. |
| 7,073,387 B2 | 7/2006 | Zdeblick et al. |
| 7,081,125 B2 | 7/2006 | Edwards et al. |
| 7,137,953 B2 | 11/2006 | Eigler et al. |
| 7,146,861 B1 | 12/2006 | Cook et al. |
| 7,147,604 B1 | 12/2006 | Allen et al. |
| 7,149,587 B2 | 12/2006 | Wardle et al. |
| 7,162,926 B1 | 1/2007 | Guziak et al. |
| 7,192,001 B2 | 3/2007 | Wise et al. |
| 7,198,603 B2 | 4/2007 | Penner et al. |
| 7,211,048 B1 | 5/2007 | Najafi et al. |
| 7,228,735 B2 | 6/2007 | Sparks et al. |
| 7,245,117 B1 | 7/2007 | Joy et al. |
| 7,273,457 B2 | 9/2007 | Penner |
| 7,284,442 B2 | 10/2007 | Fleischman et al. |
| 7,290,454 B2 | 11/2007 | Liu |
| 7,425,200 B2 | 9/2008 | Brockway et al. |
| 7,432,723 B2 | 10/2008 | Ellis et al. |
| 7,466,120 B2 | 12/2008 | Miller et al. |
| 7,483,805 B2 | 1/2009 | Sparks et al. |
| 7,498,799 B2 | 3/2009 | Allen et al. |
| 7,550,978 B2 | 6/2009 | Joy et al. |
| 7,641,619 B2 | 1/2010 | Penner |
| 7,679,355 B2 | 3/2010 | Allen et al. |
| 7,839,153 B2 | 11/2010 | Joy et al. |
| 7,936,174 B2 | 5/2011 | Ellis et al. |
| 8,154,389 B2 | 4/2012 | Rowland et al. |
| 8,432,265 B2 | 4/2013 | Rowland et al. |
| 8,493,187 B2 | 7/2013 | Rowland et al. |
| 8,570,186 B2 | 10/2013 | Nagy et al. |
| 2002/0045921 A1 | 4/2002 | Wolinsky et al. |
| 2002/0072656 A1 | 6/2002 | Vantassel et al. |
| 2002/0115920 A1 | 8/2002 | Rich et al. |
| 2002/0138009 A1 | 9/2002 | Brockway et al. |
| 2002/0151816 A1 | 10/2002 | Rich et al. |
| 2002/0177782 A1 | 11/2002 | Penner |
| 2002/0188207 A1 | 12/2002 | Richter |
| 2003/0062957 A1 | 4/2003 | Terashima et al. |
| 2003/0136417 A1 | 7/2003 | Fonesca et al. |
| 2003/0139677 A1 | 7/2003 | Fonesca et al. |
| 2003/0139771 A1 | 7/2003 | Fisher et al. |
| 2003/0158584 A1 | 8/2003 | Cates et al. |
| 2003/0191496 A1 | 10/2003 | Edwards et al. |
| 2004/0102806 A1 | 5/2004 | Broome et al. |
| 2004/0158138 A1 | 8/2004 | Kilcoyne et al. |
| 2004/0220637 A1 | 11/2004 | Zdeblick et al. |
| 2004/0255643 A1 | 12/2004 | Wise et al. |
| 2004/0260164 A1 | 12/2004 | Kilcoyne et al. |
| 2005/0013685 A1 | 1/2005 | Ricketts et al. |
| 2005/0015014 A1 | 1/2005 | Fonseca et al. |
| 2005/0043601 A1 | 2/2005 | Kilcoyne et al. |
| 2005/0049634 A1 | 3/2005 | Chopra |
| 2005/0080346 A1 | 4/2005 | Gianchandani et al. |
| 2005/0090719 A1 | 4/2005 | Scheiner et al. |
| 2005/0103114 A1 | 5/2005 | Bly et al. |
| 2005/0154321 A1 | 7/2005 | Wolinsky et al. |

(56) References Cited

U.S. PATENT DOCUMENTS

| | | |
|---|---|---|
| 2005/0160825 A1 | 7/2005 | Zdeblick et al. |
| 2005/0160827 A1 | 7/2005 | Zdeblick et al. |
| 2005/0187482 A1 | 8/2005 | O'Brien et al. |
| 2005/0228308 A1 | 10/2005 | Iddan et al. |
| 2005/0288596 A1 | 12/2005 | Eigler et al. |
| 2005/0288604 A1 | 12/2005 | Eigler et al. |
| 2005/0288722 A1 | 12/2005 | Eigler et al. |
| 2006/0047205 A1 | 3/2006 | Ludomirsky et al. |
| 2006/0052821 A1 | 3/2006 | Abbot et al. |
| 2006/0064133 A1 | 3/2006 | Von Arx et al. |
| 2006/0064134 A1 | 3/2006 | Mazar et al. |
| 2006/0064142 A1 | 3/2006 | Chavan et al. |
| 2006/0064143 A1 | 3/2006 | Von Arx et al. |
| 2006/0116590 A1 | 6/2006 | Fayram et al. |
| 2006/0122522 A1 | 6/2006 | Chavan et al. |
| 2006/0129050 A1 | 6/2006 | Martinson et al. |
| 2006/0161171 A1 | 7/2006 | Schwartz |
| 2006/0177956 A1 | 8/2006 | O'Brien et al. |
| 2006/0178583 A1 | 8/2006 | Montegrande et al. |
| 2006/0178695 A1 | 8/2006 | Decant, Jr. et al. |
| 2006/0196277 A1 | 9/2006 | Allen et al. |
| 2006/0206146 A1 | 9/2006 | Tenerz |
| 2006/0212047 A1 | 9/2006 | Abbot et al. |
| 2006/0217762 A1 | 9/2006 | Meahs et al. |
| 2006/0217763 A1 | 9/2006 | Abbot et al. |
| 2006/0217764 A1 | 9/2006 | Abbot et al. |
| 2006/0229488 A1 | 10/2006 | Ayre et al. |
| 2006/0241354 A1 | 10/2006 | Allen |
| 2006/0244465 A1 | 11/2006 | Kroh et al. |
| 2006/0271078 A1 | 11/2006 | Modesitt |
| 2006/0287602 A1 | 12/2006 | O'Brien et al. |
| 2007/0007240 A1 | 1/2007 | Wise et al. |
| 2007/0028698 A1 | 2/2007 | Guziak et al. |
| 2007/0032734 A1 | 2/2007 | Najafi et al. |
| 2007/0049980 A1 | 3/2007 | Zielinski et al. |
| 2007/0049984 A1 | 3/2007 | Osypka |
| 2007/0060959 A1 | 3/2007 | Salo et al. |
| 2007/0073351 A1 | 3/2007 | Zielinski et al. |
| 2007/0088388 A1 | 4/2007 | Opolski et al. |
| 2007/0096715 A1 | 5/2007 | Joy et al. |
| 2007/0100215 A1 | 5/2007 | Powers et al. |
| 2007/0106246 A1 | 5/2007 | Modesitt |
| 2007/0106328 A1 | 5/2007 | Wardle et al. |
| 2007/0106333 A1 | 5/2007 | Fernandez |
| 2007/0112358 A1 | 5/2007 | Abbot et al. |
| 2007/0118039 A1 | 5/2007 | Bodecker et al. |
| 2007/0149880 A1 | 6/2007 | Willis |
| 2007/0160748 A1 | 7/2007 | Schugt et al. |
| 2007/0210786 A1 | 9/2007 | Allen et al. |
| 2007/0290802 A1* | 12/2007 | Batra ............... G06K 7/0008 340/10.1 |
| 2008/0012579 A1* | 1/2008 | Kuhns ............... G06K 19/0717 324/652 |
| 2008/0224826 A1* | 9/2008 | Kuwako ............. G06K 7/0008 340/10.1 |
| 2008/0281212 A1 | 11/2008 | Nunez et al. |
| 2009/0115396 A1 | 5/2009 | Allen et al. |
| 2009/0224773 A1 | 9/2009 | Joy et al. |
| 2009/0224837 A1 | 9/2009 | Joy et al. |
| 2010/0026318 A1 | 2/2010 | Kroh et al. |
| 2010/0161004 A1 | 6/2010 | Najafi et al. |
| 2010/0308974 A1* | 12/2010 | Rowland ............. A61B 5/0031 340/10.4 |
| 2012/0286934 A1 | 11/2012 | Rowland et al. |
| 2012/0319862 A1 | 12/2012 | Nagy et al. |
| 2013/0303869 A1* | 11/2013 | Rebec ............... A61B 5/14532 600/365 |
| 2014/0292534 A1 | 10/2014 | Stever et al. |
| 2014/0306807 A1 | 10/2014 | Rowland et al. |
| 2016/0220089 A1* | 8/2016 | Peukert ............. A47L 15/0049 |

FOREIGN PATENT DOCUMENTS

| | | |
|---|---|---|
| JP | 2006-512112 | 4/2006 |
| JP | 2008-532590 | 8/2008 |
| KR | 20130118479 A | 10/2013 |
| WO | WO2004045407 A1 | 6/2004 |
| WO | WO2005/107583 | 11/2005 |
| WO | WO2006/070278 | 7/2006 |
| WO | WO2006096582 A1 | 9/2006 |
| WO | WO2006/130488 | 12/2006 |
| WO | WO2007/030489 | 3/2007 |
| WO | WO2008/115456 | 9/2008 |
| WO | WO2010/117356 | 10/2010 |
| WO | WO2010/117597 | 10/2010 |

OTHER PUBLICATIONS

International Preliminary Report on Patentability, Endotronix, Inc., PCT/US2012/034979, dated Nov. 7, 2013.

International Search Report and the Written Opinion of the International Searching Authority, Endotronix, Inc., PCT/US2012/34979, dated Nov. 2, 2012.

International Preliminary Report on Patentability, Nunez, Anthony, I. et al., PCT/US2008/003475, dated Sep. 24, 2009.

International Search Report and the Written Opinion of the International Searching Authority, Endotronix, Inc., PCT/US2009/39730, dated Jun. 30, 2009.

International Search Report and the Written Opinion of the International Searching Authority, Endotronix, Inc., PCT/US2010/27951, dated Aug. 25, 2010.

International Search Report and the Written Opinion of the International Searching Authority, Nunez, Anthony I, PCT/US2008/03475, dated Aug. 4, 2008.

Collins, Carter, Miniature Passive Pressure Transensor for Implanting in the Eye, Transactions on Bio-Medical Engineering, vol. BME-14, No. 2, pp. 74-83, Apr. 1967.

Nagumo, J., Uchiyama, A., Kimoto, S., Watanuki, T., Hori, M., Suma, K, Ouchi, A., Kumano, M., and Watanabe, H, Echo Capsule for Medical Use (A Batteryless Endoradiosonde), IRE Transaction on Bio-Medical Electronics, pp. 195-199, 1962.

Haynes, H.E & Witchey, A.L. , Medical Electronics: The Pill That "Talks", DEP, pp. 52-54, Camden, N.J.

Medical Device and Diagnostic Industry Website: List of XChallenge Finalists: Endotronix Wireless Health Monitoring, posted Oct. 22, 2014, http://www.mddionline.com/article/nokia-sensing-xchallenge-finalists-endotronix.

Endotronix Wireless Health Monitoring video on the Endotronix website: http://endotronix.com/the-endotronix-care-management-solution/.

ISA/EP, International Search Report and Written Opinion, prepared for PCT/US2016/050081, dated Dec. 2, 2015.

* cited by examiner

SELF TEST DEVICE AND METHOD FOR WIRELESS SENSOR READER

TECHNICAL FIELD

This invention relates generally to a system for testing a device configured for reading wireless sensors, and more particularly to a system and method for testing the device for functionality and accuracy.

BACKGROUND

Known wireless sensor systems place a sensor in a remote location, where it is impractical to perform an accuracy check on the deployed sensor due to the environment in which the sensor is placed. Many environments do not allow for a separate reference reading of the parameter being sensed due to the remote location's environmental or spatial constraints. In one example, the remote location is a body. Wireless sensor systems may generally include a reader unit or device that may have a configuration where it is placed in a use condition for taking readings from the sensor and in a resting condition in which it is not communicating with the sensor. For example, a reader unit may be handheld or battery operated and be adapted for use a few minutes each day. This reader unit may also be configured to sit on a recharging ("docking") station during times of non-use. However, these reader and sensor systems may be field-deployed such that it may be impractical to conduct factory testing and calibration to determine or correct the accuracy of the system. It may also be impractical or cost prohibitive to send a service technician to the field to check system accuracy. Thus, it is desirable for the wireless sensor/reader system to be able to conduct a self-test to assess its own performance and accuracy. It is also desirable that the self-test require minimal extra equipment, and minimal effort by the user of the device. It is also desirable that the self-test does not interrupt, slow down, delay, or otherwise disturb the reader's sensor interrogation function.

Reader units may be placed in a standard location, such as a charging or docking station, when not actively communicating with the sensor. The need for simple, cost-effective, low-effort self-test in the field is shared by sensor/reader systems incorporating many types of wireless technology: active & passive sensors, continuous wave (CW) & modulated data transmission, and analog & digital type systems.

In one application, passive wireless sensor systems may employ resonant circuit technology. These systems utilize a passive wireless sensor in remote communication with excitation and reader circuitry. Often the wireless sensor is placed in a specific location, such as within the human body, to detect and report a sensed parameter. The sensed parameter varies a resonant circuit frequency of the wireless sensor. A reader device samples and analyzes the resonant frequency of the wireless sensor to determine the sensed parameter.

Passive wireless sensor systems may be pressure monitoring devices for use by themselves or incorporated into other medical devices including, without limitation, pacemakers and defibrillators. In one embodiment, a medical device includes one or more pressure sensors that is configured to be positioned at a desired location within the human body. The pressure sensor may be fabricated using a microelectromechanical systems (MEMS) technique and may be configured to transmit wireless data to an external receiver/reader to facilitate data transmission of parameter measurements to the external receiver/reader for observation by a practicing physician or a patient.

One such pressure sensor formed using a MEMS technique has an inductive and capacitive nature. The sensor acts as an inductor (L) and a capacitor (C) connected together in parallel, commonly called an LC tank circuit. The geometry of the sensor allows for the deformation of a capacitive plate with increased pressure. This deformation leads to a deflection of the plate and hence a change in the capacitance value of the system. The LC tank circuit also generates an electronic resonating frequency. This resonating frequency is related to the inductive and capacitance values of the circuit and will change with the deflection of capacitor plates under changing pressure. This emitted resonating frequency signal is received by an external wireless receiver/reader and deciphered into a correlative pressure reading.

Such sensors may also include wireless data transmission ability. The device may require no battery or internal power. Rather, the sensor may be powered by an inductively coupled electromagnetic (EM) field that is directed towards the inductor coil, the receiver/reader device may provide the electromagnetic field by generating a radio frequency (RF) burst or other signal. The inductor receives energy from the EM field to charge the capacitor, where the value of the capacitance varies with environmental pressure. When the EM field is removed, the inductance and capacitance form a parallel resonant circuit to radiate energy through the inductor which acts as an antenna. This oscillating circuit will then produce inherent RF signals, whose frequency is proportional to the capacitive values of the sensor. The inductor coil may serve both as an inductor creating the oscillating RF signals having a frequency proportional to the capacitance of the sensor at a certain pressure, and as an antenna coil emitting the RF signal generated by the LC tank circuitry.

In one embodiment, the pressure sensor may include an inductor/capacitor circuitry assembled in a parallel configuration, or may include a piezoelectric, piezo-resistive or capacitive pressure sensor. In the inductor/capacitor circuitry, the resonating frequency of the energized circuit will change with the internal pressure of the heart. The sensor transmits sensed or detected pressure readings wirelessly to an external system receiver through RF signals without the requirements of an internal powering system. In a particular embodiment, the sensor may be energized through electromagnetic fields that are directed to a circuitry of the sensor.

The pressure sensor may be configured to provide a working surface that is exposed to blood inside the heart or vasculature. This exposure to the internal blood environment exposes the pressure sensor components to the pressure of the blood and allows the pressure sensor to measure and record a corresponding pressure measurement and transmit the pressure measurement to the user.

The cardiac pressure monitoring device may be used as a long-term care monitoring device for patients with chronic heart disease, however the cardiac pressure monitoring device may also be used as a short-term care monitoring device. The pressure data obtained by the sensor/reader system may allow caregivers and clinicians to obtain additional diagnostic data for the patient at a reduced cost compared to other systems and methods.

Although the following disclosure describes a sensor and reader system that is configured to measure and/or monitor an internal fluid pressure within the cardiovascular system to obtain data for guiding therapy, it should be apparent to those skilled in the art that the system as described herein may be configured to measure one or more physical, chemical, and/or physiological parameters or variables to facilitate obtaining data for temperature analysis, blood chemical analysis, blood osmolar analysis, and cellular count analysis, for example. It may also be configured to measure parameters in non-medical applications. The pressure monitoring device may include a pressure sensor, an optical sensor, a biochemical sensor, a protein sensor, a motion sensor (e.g., an accelerometer or a gyroscope), a temperature sensor, a chemical sensor (e.g., a pH sensor), and/or a genetic sensor, for example.

Current designs for passive sensor readers, such as those disclosed in commonly owned U.S. Pat. No. 8,154,389 filed on Apr. 7, 2008, U.S. Pat. No. 8,432,265 filed on Mar. 19, 2012, U.S. Pat. No. 8,493,187 filed on Mar. 19, 2010, and U.S. Pat. No. 8,570,186 filed on Apr. 25, 2012 are incorporated by reference herein. These patents disclose systems configured to communicate wirelessly with a sensor at a remote location and obtain a reading. The reader may be deployed in a use environment and be required to maintain functionality and accuracy over time with few, or no, maintenance activities performed on the reader throughout its rated lifetime. However, there is a need for a simple, inexpensive system and method for testing the reliability of the reader in the field, to ensure functionality and accuracy.

BRIEF DESCRIPTION OF THE DRAWINGS

Objects and advantages together with the operation of the invention may be better understood by reference to the following detailed description taken in connection with the following illustrations, wherein.

SUMMARY

Disclosed is a self-test device, system, and method for testing the accuracy of a reader device that is configured to communicate with a wireless sensor. The self-test device may be configured to assess the accuracy of readings taken by the reader device. In one embodiment, the reader device may be configured to engage the self-test device by transmitting a signal, such as a short pulse of energy or a short burst of radio frequency energy to cause the self-test device to output a resonant signal. The self-test device may receive the transmit signal from the reader and evaluate it against predetermined values. The evaluated signals may be used to assess the accuracy of the transmit signal of the reader device to assess reader system health, identify possible drift issues (gradual deviation from original accuracy) and initiate remedial action by an automated system or human intervention if needed.

In one embodiment, the self-test device may be configured to emit a predetermined signal to a reader device. The self-test device may be a sensor emulator system. The sensor emulator may be an electronic system that behaves like a deployed sensor, but for the communicated values are predetermined. These values may be exact, controlled, and programmed to assist with determining an accuracy of the system. The self-test device may be placed within a docking station. The docking station may be any structure or device where the reader device may be placed when it is not communicating with the deployed sensor. The docking station may be a holder and may provide additional functions such as to charge a battery of the reader device, or to provide a datalink to an external processor or to a network. The docking station may also be configured to receive inputs and display outputs on a display panel. The reader device may receive the predetermined signal from the self-test device and may process the signal to provide an output signal. The output signal may be evaluated to assess the accuracy of the reader device, by comparing the read value to the predetermined emulator output, in order to identify calibration issues and initiate remedial action by an automated system or human intervention if needed.

In another embodiment, the self-test device may be configured to test the accuracy and functionality of the reader device. The self-test device may be configured to receive inputs from the reader device and provide sensor-like outputs. The sensor-like outputs of the self-test device may be predetermined and based on the input from the reader device. The reader device may be configured to perform a self-test by transmitting inputs to the self-test device, receiving outputs form the self-test device, and evaluating those outputs against predetermined values. The reader device may perform this evaluation on its own processor, or may relay its readings to another processor for analysis. The reader device may use the evaluated results to assess reader device health, flag potential problems, and initiate remedial action. The self-test device is configured to engage the reader device such that the known signal is provided from a known location related to an antenna or receiver of the reader device, to eliminate variation in self-test outcome due to random changes in spatial positioning. The test device may also be built into a docking station having a display wherein the docking station may be configured to charge the reader device.

Further, disclosed is a system for wirelessly sensing a parameter from a remote location. The system includes a wireless reader configured to communicate with a wireless sensor, and a self-test device which emulates at least one electrical behavior of said wireless sensor in a known manner when placed in communication with said reader. The system may be configured to carry out a self-test such that said reader wirelessly communicates with said self-test device and obtains at least one response from said self-test device, and said at least one response may be compared to an expected response from said self-test device, in order to assess a functional performance of said reader. The wireless sensor may be configured to change its resonant frequency in proportion to at least one sensed parameter.

The self-test device may be powered wirelessly by said reader or may be battery powered. The self-test device may communicate with said reader using digital data, a modulated signal, or a continuous wave signal.

The reader may be a handheld device that may be battery powered and configured to be placed in a standard docking station when not in use. The self-test device may be built into the docking station. The docking station may provide a battery charging function or a data link function to said reader. The self-test device may be powered by said docking station.

The self-test device may be configured to change said at least one response to said reader, in order to emulate a plurality of operational states of said sensor. The self-test device may be configured to change its at least one response to said reader in order to emulate said responses from said wireless sensor when said wireless sensor is exposed to a plurality of environmental conditions. The self-test device may be configured to adjust its Q factor and its resonant frequency. Further, the said self-test device may be configured to change its at least one response to said reader in order to emulate said response of said wireless sensor when said sensor is positioned relative to said reader at a plurality of Radio Frequency (RF) link distances. The self-test device may include an antenna that is electrically similar to said antenna of said sensor. The self-test device may be configured to measure power transmissions from said reader. The self-test device may be configured to sample transmissions from said reader for analysis. The self-test device may include an LC resonant tank circuit wherein said LC resonant tank circuit's resonant frequency may be adjustable. The wireless sensor may be powered by inductive coupling.

The comparison of said at least one response to said expected response may be made by said reader or may be made by a system external to said reader. The assessment of the functional performance of said reader may be made by said reader or may be made by a system external to said reader wherein the assessment may be communicated back to said reader. The system may evaluate the comparison of said at least one response to said expected response against at least one predetermined threshold wherein the system may take action when said comparison value exceeds said predetermined threshold value.

The self-test may be initiated by a circuit for measuring time interval, a real-time clock, a user input, an input from another device, a signal indicating said reader has been docked, or a wakeup timer. The at least one result of said assessment may be displayed on a screen. The at least one result of said assessment may be communicated to an external device.

In another embodiment, provided is a method for self-testing a reader device, the method includes providing a wireless reader configured to communicate with a wireless sensor. The reader may be placed in communication with a self-test device, said self-test device configured to emulate at least one electrical behavior of said wireless sensor in a known manner. A self-test may be conducted such that said reader wirelessly communicates with said self-test device and obtains at least one response. The at least one response may be compared to at least one expected response from said self-test device in order to assess a functional performance of said reader.

The resonant frequency of said wireless sensor may be changed in proportion to at least one sensed parameter. The self-test device may be powered wirelessly by said reader or with a battery. The self-test device may communicate with said reader using digital data, a modulated signal, or a continuous wave signal.

The reader may be placed in a standard docking station when not in communication with said wireless sensor wherein the self-test device may be built into said docking station. The battery of said reader may be charged by placing said reader in said docking station. The data link function may be provided to said reader from said docking station. The docking station may provide power to said self-test device.

The at least one response of said self-test device to said reader may be changed in order to emulate a plurality of operational states of said sensor. The at least one response of said self-test device to said reader may be changed in order to emulate said responses from said wireless sensor when said wireless sensor is exposed to a plurality of environmental conditions. The Q factor and resonant frequency of said self-test device may be adjusted. The at least one response from said self-test device to said reader may be changed in order to emulate said response of said wireless sensor when said sensor is positioned relative said reader at a plurality of Radio Frequency (RF) link distances.

The power transmission from said reader may be measured. The transmissions from said reader for analyzing said transmissions may be sampled. The resonant frequency of an LC resonant tank circuit of said self-test device may be adjusted.

The functional performance of said reader may be assessed and may be communicated to said reader. The comparison of said at least one response to said expected response may be evaluated against at least one predetermined threshold. Action may be taken when said comparison value exceeds said predetermined threshold value.

The self test may be initiated by a circuit for measuring time interval, a real-time clock, a user input, an input from another device, a signal indicating said reader has been docked, or a wakeup timer. The results of said assessment may be displayed on a screen. The results of the assessment may be communicated to an external device.

In another embodiment, provided is a system for wirelessly sensing a parameter from a remote location. The system may include a wireless sensor configured to change its resonant frequency in proportion to at least one sensed parameter. A reader configured to transmit an excitation pulse at only a fixed frequency to said wireless sensor, to receive a signal from said wireless sensor in response to said excitation pulse, and to sample and hold said received signal. A self-test device which emulates an electrical behavior of said wireless sensor in a known manner when placed in communication with said reader. The system may be configured to carry out a self-test such that said reader wirelessly communicates with said self-test device and obtains at least one response. The at least one response may be compared to at least one expected response from said self-test device in order to assess a functional performance of said reader. The system may evaluate said comparison of said response to said expected response against at least one predetermined threshold.

In one embodiment, provided is a system for obtaining a measurement from a remote location. The system may include a wireless sensor configured to change its resonant frequency in proportion to at least one sensed parameter. A handheld, battery-powered reader configured to transmit an excitation pulse at only a fixed frequency to said wireless sensor and to receive a signal from said wireless sensor in response to said excitation pulse. A self-test device which emulates at least one electrical behavior of said wireless sensor in a known manner when placed in communication with said reader. The system may be configured to carry out a self-test such that said reader wirelessly transmits said excitation pulse to said self-test device and obtains at least one response. The at least one response may be compared to at least one expected response from said self-test device in order to assess a functional performance of said reader.

In another embodiment, provided is a method of obtaining a measurement from a remote location. The method may include transmitting an excitation pulse to a wireless sensor. A signal may be received from said wireless sensor in response to said excitation pulse. A count signal may be generated and the frequency of said count signal may be adjusted to match the frequency of said received signal. The frequency of the count signal may be held temporarily constant to be ascertained wherein said wireless sensor may be configured to adjust is resonant frequency in proportion to at least one predetermined parameter. The reader may be placed in communication with a self-test device during times when said reader is not in communication with said sensor. The self-test device may be configured to emulate at least one electrical behavior of said sensor in a known manner. A self-test may be conducted such that said reader wirelessly communicates with said self-test device and obtains at least one response. The at least one response may be compared to at least one expected response from said self-test. The excitation pulse may be a fixed frequency pulse.

In another embodiment, provided is a wireless sensor reader that may include a transmit circuit configured to generate an excitation pulse to cause a wireless sensor to emit a ring signal. An antenna may be configured to transmit said excitation pulse and receive said ring signal. A phase-locked loop circuit may be configured to receive said ring signal, said phase-locked loop circuit may include a voltage-controlled oscillator configured to generate a count signal at a frequency related to said ring signal frequency. The phase-locked loop circuit may be capable of being placed in a sample mode to receive said ring signal and adjust the frequency of said count signal based on the frequency of said ring signal. The phase-locked loop circuit may be capable of being placed in a hold mode to hold the frequency of said count signal constant for a length of time sufficient to determine the frequency of said count signal. A self-test device may emulate at least one electrical behavior of said wireless sensor in a known manner when placed in communication with said reader. The system may be configured to carry out a self-test such that said reader wirelessly communicates with said self-test device and obtains at least one response. The at least one response may be compared to an expected response from said self-test device, in order to assess a functional performance of said reader.

An advantage of this system is that the reader device may be in a known state when engaged to the docking station. An antenna of the reader device may be positioned in a standard uniform location relative to an antenna of the self-test sensor device. This may eliminate reading inaccuracy due to varying reader antenna positions (ie. x, y, and z axes, angular offset, or motion in terms of relative positions of the reader/sensor antennas.). The self-test device may be employed in a more controlled environment than the sensor/reader system's normal use environment.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the present invention.

Figure 1:
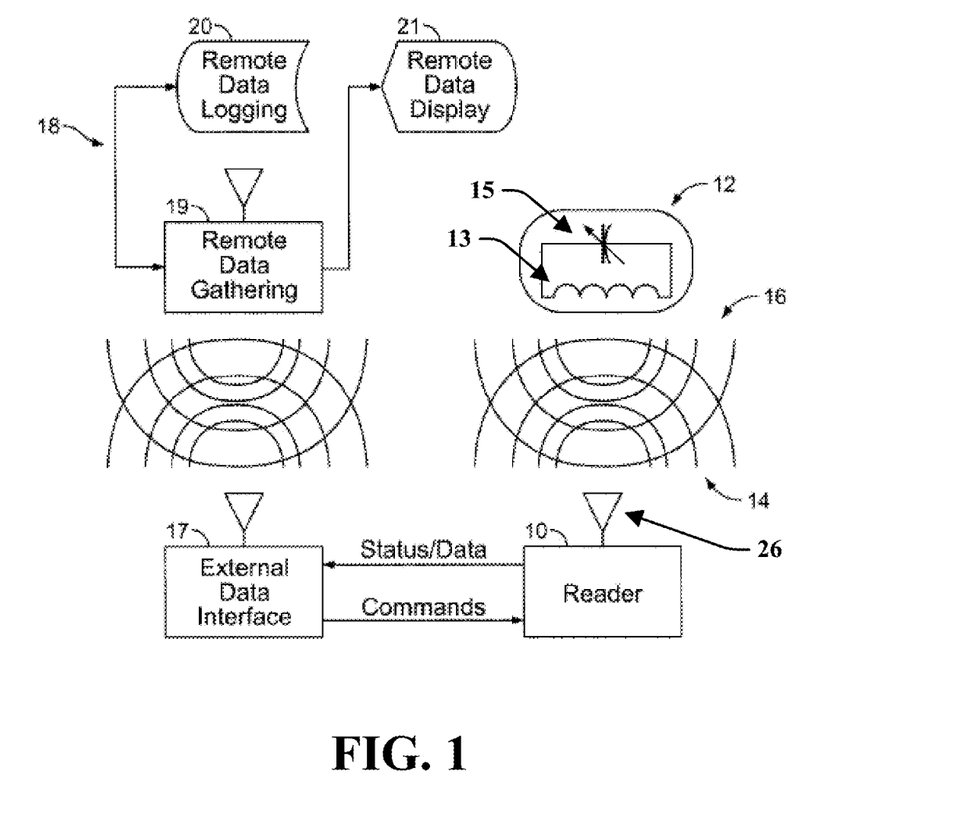
FIG. 1 illustrates a block diagram of a passive wireless sensor and reader system.
Figure 2:
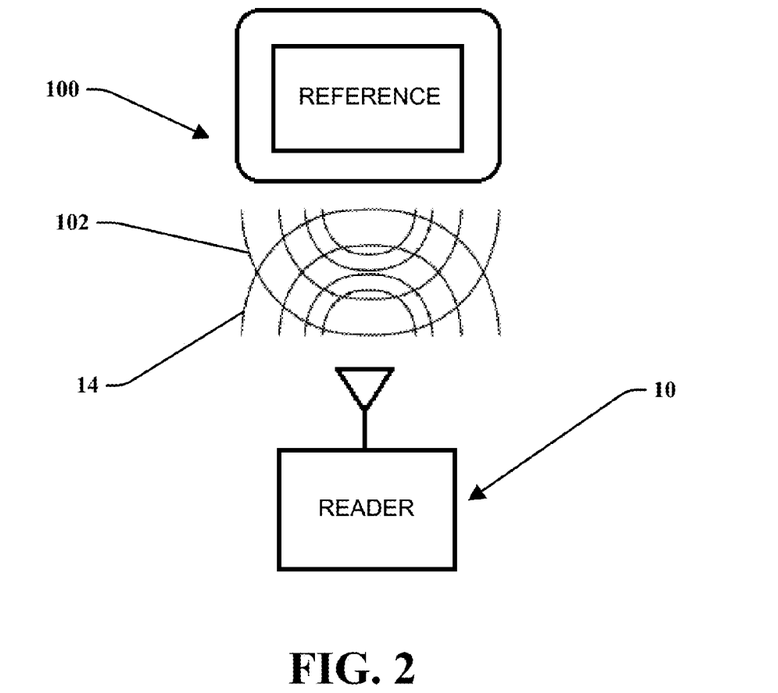
FIG. 2 illustrates a block diagram of a self-test device for testing the accuracy of a reader device.

An apparatus and method for self-testing a wireless reader device is disclosed. As illustrated by FIG. 2, a self-test device comprising a sensor emulator 100 may be configured to wirelessly communicate reference data 102 with a reader device 10 that is configured to remotely and wirelessly communicate with a sensor 12, shown in FIG. 1. The self-test device 100 may be configured to behave in a manner that is electrically similar to the behavior of the wireless sensor 12, including producing a wireless signal that is electrically similar to that of wireless sensor 12, or receiving power or data transmissions from the reader in a manner similar to that of wireless sensor 12. The wireless sensor 12 may be a passive type sensor. As illustrated by FIG. 1, the reader device 10 may be capable of exciting the sensor 12 by transmitting a signal 14 (excitation pulse), such as a radio frequency ("RF") pulse, at or near the resonant frequency of the sensor 12. The sensor 12 may emit a ring frequency signal 16 for a short period of time in response to the signal/excitation pulse 14 from the reader 10. In particular, the sensor 12 may be designed to be placed within the cardiovascular system of a human to provide a signal that may be a function of a sensed parameter (such as blood pressure) that is desirable to be identified. The reader device 10 may be configured to receive and ascertain the ring frequency signal 16 via wireless communication with the sensor 12 and extrapolate the sensed parameter.

The sensor 12 may be a passive device, capable of emitting the ring frequency signal 16 in response to the excitation signal 14 at or near the resonant frequency of the sensor 12. The sensor 12 may be configured to sense a specific parameter. The corresponding reader 10 may employ corresponding signals to activate the sensor 12. The sensor 12 may include a capacitor 15 and an inductor 13. The reader device 10 may excite the sensor 12 by transmitting the excitation pulse 14 in the vicinity of the sensor 12. For example, the reader may emit the radio frequency ("RF") excitation pulse 14 at or near the resonant frequency of the sensor 12. The sensor 12 may emit the ring frequency signal 16 in response to the excitation pulse 14. The reader 10 may receive the ring frequency signal 16 and determine the frequency of the signal 16 in order to extrapolate the data to determine the sensed parameter value. See FIG. 1.

The sensor 12 may also be an active sensor, powered by a battery, which does not require a power pulse to be transmitted from reader 10. The sensor 12 may also communicate via a digital or analog wireless signal using any of the many modulation schemes well-known in the art.

The reader 10 may also communicate with a data interface 17. The reader 10 and data interface 17 may be connected directly or indirectly, or may communicate via a remote connection. The reader 10 may send information, such as data related to the sensor 12 to the data interface 17. The reader 10 may further send information regarding the status of the reader 10 to the data interface 17. The data interface 17 may provide configuration information to the reader 10. For example, the data interface 17 may provide information regarding schedules and intervals for sampling the sensor 12.

The data interface 17 may communicate with a remote data gathering system 18 to exchange status and control signals, as well as provide sensor data. The remote data system 18 may include a data gathering module 19 to receive data from the data interface 17, a data logging module 20 to store the received data, and a data display 21 to display the sensor data.

This disclosure may apply to any embodiment of a wireless sensor system that is configured to be emulated, i.e., whose electrical interaction with its associated reader device may be reproduced in a repeatable, controlled fashion by an electrical circuit. Thus, various reader and sensor type systems (e.g. active sensors, passive sensors, continuous wave sensors, modulated sensors, analog sensors and digital type systems) may be utilized in the system described by this disclosure. The following description will focus, by way of example, on the sensor type described by the prior art identified to be incorporated by reference above.

However, from time to time, the accuracy of the reader device 10 may become inconsistent and otherwise may require calibration or further maintenance to ensure accurate pulse frequency and accurate readings. As illustrated by FIGS. 2-8, the self-test sensor device 100 may be provided to behave in an electrically similar way as the sensor 12 while the reader 10 is not in use. In particular, the self-test sensor device 100 may be provided to allow the reader 10 to conduct a "self-test" to assist with accuracy assessment and possible calibration of the reader 10. The self-test sensor device 100 may include a capacitor 115 and an inductor 113 within a housing 114. The inductor 113 may be configured into a coil and may be referred to as the antenna of the self-test sensor device 100.

In one embodiment, the reader 10 may emit the excitation pulse 14 to be received by the self-test sensor device 100. The self-test sensor device 100 may receive the transmitted excitation pulse 14 and evaluate it against predetermined values. The evaluation may conclude that the excitation pulse 14 is calibrated and in acceptable working order or that the excitation pulse 14 is inaccurate and additional remedial measures are to be taken. In an embodiment, the reader device 10 may interact with self-test sensor device 100 using near-field RF communication or inductive coupling. The self-test sensor device 100 may be configured to assess the calibration of the initial excitation pulse 14. The self-test sensor device 100 may carry out the assessment with its own internal circuitry, or may communicate the results to an external device which carries out the assessment. It may also communicate it to a human operator for assessment. The self-test sensor device 100 may measure transmitted power or data directly from the reader device 10 and report on or evaluate parameters such as signal strength, duration, frequency, data, SNR, or other parameters of interest.

Figure 3:
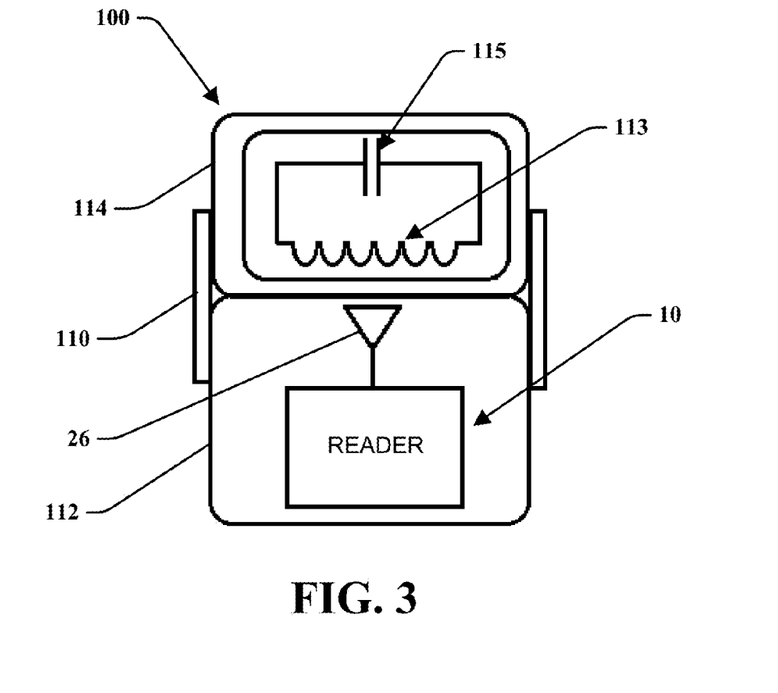
FIG. 3 illustrates an embodiment of the self-test device.
Figure 8:
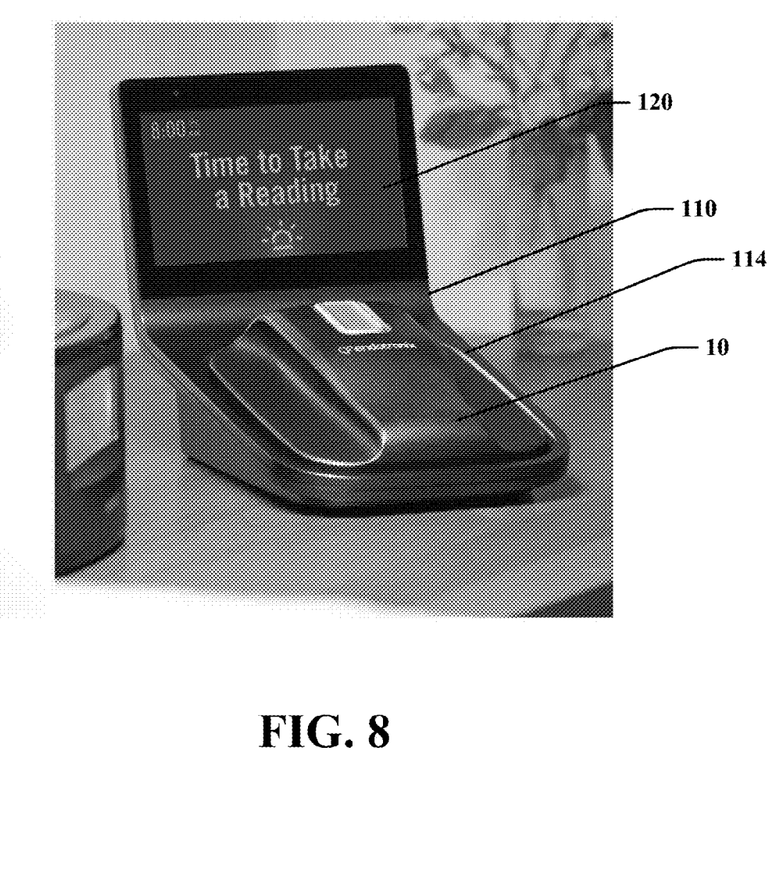
FIG. 8 illustrates an embodiment of a docking station for the reader device.

In another embodiment, the self-test sensor device 100 may be configured into the form of a docking station 110 for the reader device 10. As illustrated by FIG. 3 and FIG. 8, the reader 10 may be selectively engaged to docking station 110 wherein a signal indication may be effected to notify the self-test sensor device 100 of the presence of the reader device 10. The reader device 10 may be prompted to emit the excitation pulse 14. In response to the excitation pulse 14 or other signal indication, the self-test sensor device 100 may emit a test ring signal 102 to be received by the reader device 10. The reader device 10 may receive and evaluate the frequency of the test ring signal 102 in order to determine the test parameter value. However, in this regard, the test ring signal 102 may be a pre-programmed or predetermined value such as a reference value that is already known by the evaluating entity (automated or human). In one embodiment, the reference value is known to generate a predetermined sensed parameter value after having been evaluated previously, for example at the factory, by a reference calibrated reader device. Additionally, the predetermined value of the test ring signal may be based on i) a predetermined or programmed schedule, ii) an instruction directly input from the user a the docking station, or iii) a signal from an outside source.

More particularly, the reader 10 may receive the test ring signal 102 then evaluate the test ring signal 102 to determine the sensed parameter value. The sensed parameter value may then be compared to the predetermined sensed parameter value. The differences between the sensed parameter value and the predetermined sensed parameter value may be identified wherein the reader device 10 or self-test sensor device 100 may provide a signal to the external data interface 17 indicating that the reader device 10 may require maintenance, calibration, or is in accurate working order.

Figure 4:
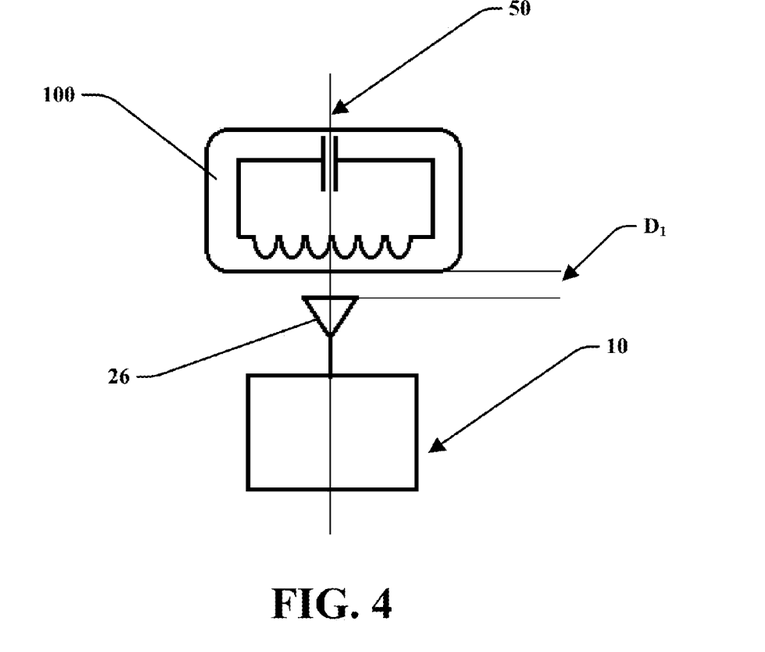
FIG. 4 illustrates an embodiment of the self-test device.

The reader 10, before or after being placed in a use condition, may perform a self-test when positioned at a location adjacent to the self-test sensor device 100. In one embodiment, the reader device 10 may include a housing 112 and the self-test sensor device 100 may include a housing 114 wherein the housings 112, 114 may be configured to be aligned and engage with one another to send and receive the pulse 14 and test ring signals 102. As illustrated by FIG. 4, an antenna 26 of the reader 10 may be at a known distance $D_1$ from the antenna 113 of the self-test sensor device 100 and be aligned along a common axis 50. The housings 112, 114 may be configured to facilitate the alignment and known distance from the antenna 26 of the reader device 100 and the antenna 113 of the self-test sensor device 100. In one embodiment, the antenna 113 of the self-test sensor device 100 is configured as an antenna coil that is identical to the antenna coil 13 of the actual sensor device 12. However, this disclosure is not limited to the configuration of the antennas 13, 113.

In one embodiment, the self-test device 100 may be configured to emulate the actual sensor 12 as sensor 12 would appear electrically in certain use environments. For example, the Quality factor Q of the self-test device may be deliberately lowered by adding resistance R to the resonant circuit, in order to emulate a larger link distance than the actual link distance D1 between the reader 10 and the self-test device 100. As further examples, the self-test device 100 may change its output to emulate different levels of the sensed parameter, different operational temperatures, or higher noise levels.

Figure 5:
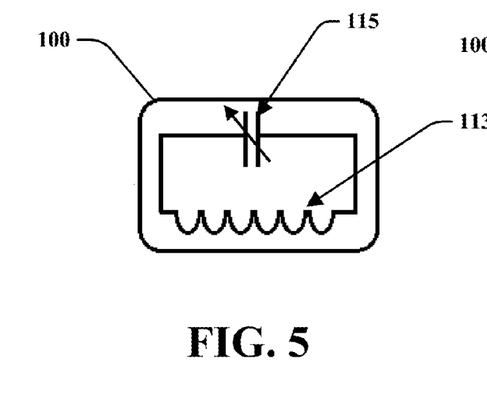
FIG. 5 illustrates an embodiment of the self-test device having variable capacitance.
Figure 6:
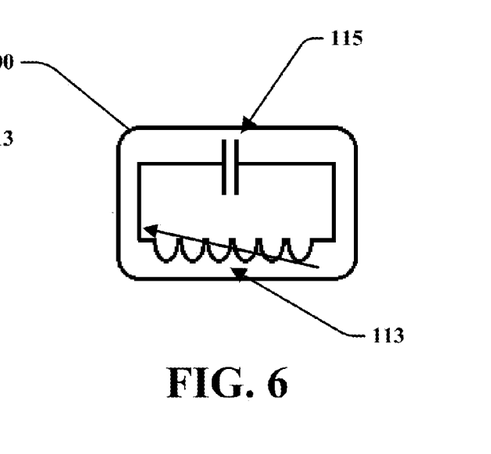
FIG. 6 illustrates an embodiment of the self-test device having variable inductance.

The self-test sensor device 100 may be an LC resonant tank circuit. The self-test sensor device 100 may include a variable capacitor 115 as illustrated by FIG. 5 or a variable inductor 113 as illustrated by FIG. 6. However, this disclosure may include various types and quantities of capacitors and inductors as this disclosure is not limited as such. A self-test sensor device may comprise an LC resonant tank that mimics electrical performance of a passive sensor at a known fixed frequency. The self-test sensor device 100 may be tunable such that it may change its resonant frequency according to a preset routine, or in response to commands, allowing self-test across some or all of the system's operational range. Additionally, the self-test sensor device 100 may be tunable to change its Quality factor (Q) to emulate a link distance between the antenna 26 of the reader device 10 and the self-test sensor device 100. The circuitry or configuration of the self-test sensor device 100 may ensures that the Q factor is a known, predetermined value.

The self-test sensor device 100 may be an LC resonant tank circuit with a fixed capacitor and inductor that is configured to provide a simple and inexpensive device for self-test at one frequency. Further, the self-test sensor device 100 may comprise several modular fixed-frequency LC resonant circuits, that are manually or automatically changeable by the user, allowing self-test at several operating frequencies.

The self-test sensor device 100 may be a digital system emulating a sensor with digital inputs and outputs wherein the inputs and outputs may be fixed or variable in response to commands or a present routine. The self-test sensor device 100 may be powered by inductive coupling or may be powered by batteries or plugged into a power receptacle or associated device.

Figure 7:
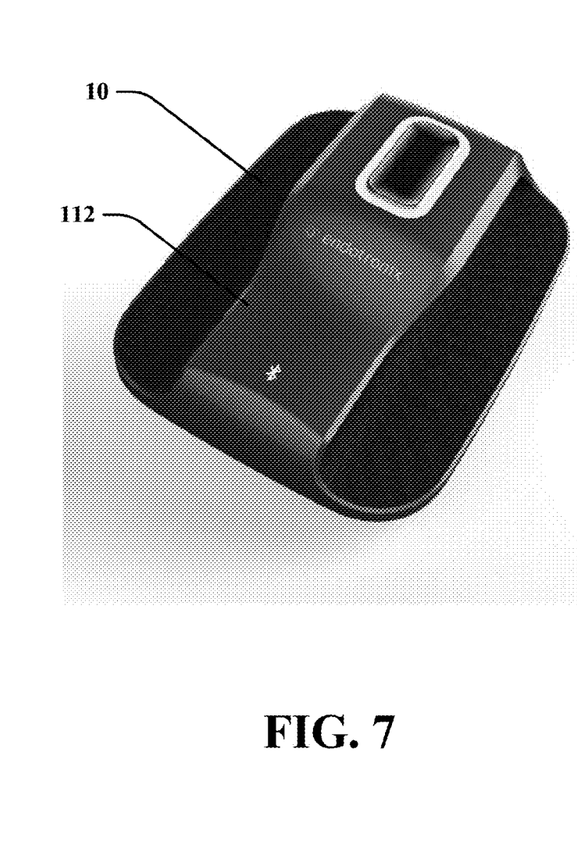
FIG. 7 illustrates an embodiment of the reader device.

The housing 112 of the reader device may accommodate a hand held reader 10 as illustrated by FIG. 7. The housing 114 of the self-test sensor device may be a docking station 110 configured to receive the housing 112 of the reader thereon. See FIG. 8. The housings 112, 114 may include structures that have complimentary shapes such that the self-test sensor device housing 114 engages the reader device housing 112 wherein the relative alignment and space of electrical components may be consistent and known. The physical arrangement of the reader device 10, as it is engages the docking station 110, may ensure that the position of the reader antenna 26 relative to the antenna coil 113 of self-test sensor device 100 is always in a known, predetermined state.

In one embodiment, the reader device 10 may include circuitry to send the excitation pulse 14, receive either the sensor ring signal 16, or the test ring signal 102, and process the ring signal 16 or test ring signal 102. For example, the reader 10 may include a timing and control circuitry to configure and activate the other circuits in the reader 10. The timing and control circuitry may include control interfaces operated by digital or low-frequency signals. The timing and control circuitry may generate an RF signal that is sent to a transmit circuitry. The transmit circuitry may receive the RF signal and send out the excitation pulse 14 to excite the sensor 12 or self-test sensor device 100.

The reader 10 may further include the antenna 26 connected to the transmit circuitry and a receive circuitry. The transmit circuitry may utilize the antenna 26 for transmitting the excitation pulse 14, while the receive circuitry may utilize the antenna 26 for receiving the ring signal 16 and the test ring signal 102. In an embodiment, the antenna 26 may be connected to both the transmit circuitry and the receive circuitry at all times instead of being switched between transmit and receive. This shared antenna 26 design may have design considerations to prevent damage to the receive circuitry. Specifically, the voltage at the antenna 26 may exceed 200 volts peak-to-peak during transmission of the excitation pulse 14, and may be single-digit millivolts, decaying rapidly to micro-volts, during reception immediately following the ring signal 16 from the sensor 12 or self-test sensor device 100. The transmit circuitry and receive circuitry may be located within the reader device 10.

While the reader 10 is described as having a shared antenna 26, it will be appreciated that the reader 10 may incorporate more than one antenna to separately perform the functions of transmitting the excitation pulse 14 and receiving the ring signal 16 or test ring signal 102.

The reader 10 may further include a PLL to receive and lock onto the ring signal 16 or the test ring signal 102. The receive circuitry may amplify and condition the ring signal 16 or test ring signal 102 before sending it to the PLL. The PLL may include a voltage controlled oscillator ("VCO") that operates at a frequency higher than the ring signal 16 or test ring signal 102 frequency. The VCO interfaces with a frequency counter which counts the VCO frequency, and provides the count to an external interface circuitry for transfer to the data interface 17.

Each component of the reader 10 is designed to operate efficiently and reduce power consumption. The transmit circuitry of the reader 10 may be configured to transmit the excitation pulse 14 to the sensor 12 by way of the antenna 26. The excitation pulse 14 may be a fixed or rapidly varying frequency burst at or near the resonant frequency of the sensor 12. For example, the excitation pulse 14 may be a fixed frequency burst within several bandwidths of the sensor 12 resonant frequency. Alternatively, the excitation pulse 14 may be a fixed or rapidly varying frequency burst or sweep of a very short duration at or near a frequency harmonically related to the sensor 12 resonant frequency. The excitation pulse 14 may also be an ultra-wide band pulse. This plurality of excitation pulse 14 approaches may be effective because the ring signal 16 may be received when the excitation pulse 14 transmissions have ceased. Therefore, excitation pulse 14 transmissions may be limited to frequency bands, amplitudes, and modulation schemes acceptable to regulatory government bodies. Radio frequency regulations generally may not apply to the sensor 12 as the sensor 12 may be a purely passive device.

The excitation pulse 14 may not require significant transmission time because a single short transmission of energy may result in a single and complete sample of the ring signal 16 or test ring signal 102. Power consumption may be reduced by using a lower transmission duty cycle, thereby reducing the duty cycle of transmit, receive, counting, and digital processing circuitry. By reducing power consumption battery power becomes a much more viable option to power the system. The excitation pulse 14 may be configured to maximize several system parameters. For example, if a fixed frequency excitation pulse 14 is used, the frequency of the burst may be configured to maximize parameters such as maximum allowable transmit peak power, maximum freedom from in-band or near-band interference during the "receive" interval while the PLL is being locked to the ring signal 16, maximum worldwide acceptance of a particular frequency for reader transmissions for the desired sensor purpose, or other such criteria. To utilize a fixed frequency in this manner, the frequency of the excitation pulse 14 may be predetermined before the sensor 12 or self-test sensor device 100 is to be sampled. This allows the excitation pulse 14 to be focused towards the resonant frequency of the sensor 12 in which the excitation pulse 14 is not a swept frequency. Use of a fixed frequency allows power consumption to be reduced. Contrarily, a swept frequency excitation pulse 14 attempts to sample the sensor to identify a resonant frequency that is of a desired magnitude or power to allow for an accurate transmission and analysis of the ring signal 16. However, a swept frequency may undesirable as it requires significant additional circuitry and therefore a larger housing for the reader device.

Once the excitation pulse 14 is transmitted by the transmit circuitry at a fixed frequency, the receive circuitry may be configured to listen for the ring signal 16 or test ring signal 102. Voltages at the antenna 26 may reach upwards of 200 volts peak-to-peak during transmission of the excitation pulse, requiring only approximately 60 pico-farads of capacitance to tune the antenna 26. In an embodiment, a 1 pico-farad capacitor may be used as a high impedance input current limiting device on a 13.5 mega-hertz transmit circuit.

In operation, both the transmit circuitry and the receive circuitry of the reader 10 may become un-calibrated wherein the particular frequency range of the excitation pulse 14 may be transmitted at an undesired frequency or the circuitry configured to receive and analyze the ring signal 16 may be compromised as to precision or accuracy.

In one embodiment, the docking station 110 includes the housing 114 having the self-test sensor device 100 configured to wirelessly communicate reference data with the reader 10. Once the reader device 10 is attached to the docking station 110, the reader 10 may be prompted to produce the excitation pulse 14. Alternatively, the reader 10 may initiate testing with no prompt, for example after a certain time interval in the docked state, at a certain time determined by a real-time clock, or immediately when the self-test sensor device 100 is sensed. The self-test sensor device 100 may receive the excitation pulse and compare it with known data. The comparison or evaluation of the excitation pulse 14 may identify whether the transmit circuitry of the reader device is sufficiently calibrated. Further, the self-test sensor device 100 can also emulate the test ring signal 102 that is received by the reader device 10. The test ring signal 102 may be received by the receive circuitry and communicated to the PLL or additional electronic elements within the reader device 10. The reader device 10 may process the test ring signal 102 and produce an output signal representative of the test ring signal 102. The output signal may be provided to the external data interface 17 or remote data gathering module 19. A processor internal to reader device 10, or an external processor connected to the external data interface 17 may compare the reader's output to expected output from the self-test. This comparison may identify if the reader device circuitry is sufficiently calibrated or if remedial actions are to be taken.

In one embodiment the external data interface 17 may be in communication with the self-test device 100. Also, the external data interface 17 may be provided within the docking station 110. The docking station 110 may include a display 120 that may be configured to illustrate indicia representative of the self-test performed by the self-test device 100. It may inform the user or remotely located service personnel if the reader device 10 is sufficiently accurate for continued use. Additionally, the docking station 110 may be configured to charge the power of the reader device 10 once the reader device 10 is engaged with the docking station 110. The docking station 110 may be wired or wireless as it may plugged into a power receptacle or powered by a battery. The docking station 110 may also be in communication with the remote data gathering module 19, remote data logging module 20, and the remote data display 21. The docking station 110 may receive inputs from a user, display information on the display 120, and communicate information from the internet or other data repository.

In one embodiment, the self-test sensor device 100 may be powered by an external source that is not the reader device. Alternatively, the self-test sensor device 100 may be passive such that it is powered wirelessly by the reader device 10.

The self-test sensor device 100 may be configured into a variety of embodiments to perform the self-test of the reader device 10. In one embodiment, the self-test sensor device 100 may be a passive LC resonant tank circuit configured to produce the test ring signal 112 wherein the test ring signal may be a continuous wave (CW) resonant frequency that is to be received and measured by the reader device 10. Additionally, the self-test sensor device 100 may be a modulated digital circuit configured to provide information in a digital form using ASK, PSK, FSK, OOK, or any of the other modulation schemes well known in the art. In another embodiment, the self-test sensor device 100 may be a modulated analog or other type of circuit configured to provide information in an analog form using AM, FM, PM, PWM, Delta-Sigma, PAM, QAM or any of the other modulation schemes well known in the art. Further, the self-test sensor device 100 may employ spread spectrum or ultrawideband RF communication techniques such as are known in the art.

In a further embodiment, the self-test sensor device 100 may be configured to communicate a fixed value, i.e. only one predetermined simulated sensed value may be provided to the reader device 10. Alternatively, the self-test sensor device 100 may be configured to communicate a variable value, i.e., a range of predetermined simulated sensed values may be provided to the reader. The self-test sensor device 100 may sweep through its range of simulated values in one self-test cycle.

In one embodiment, the reader device 10 may include circuitry that is configured to evaluate the accuracy of the output signal or reference reading and assesses its own accuracy or health. Alternatively, the reader device 10 may be configured to communicate the output signal or results of the evaluation of the reference reading via a wired or wireless data interface (e.g. bluetooth, wifi) to an external processor (local or via internet) for assessment of reader accuracy or health. The reader device 10 health assessment may trigger an action such as providing a signal to alert appropriate personnel, alert the user, or provide instructions regarding future readings, identify internal circuitry or software changes automatically performed by the reader device 10, identify a change to calibration coefficients pre-programmed in a schedule or otherwise stored in the reader device 10 or in a remote server database, and/or logging the result.

The self-test cycle may incorporate numerous readings of the self-test sensor device 100, which are averaged or otherwise post-processed by an upstream processor. Metrics such as signal strength, bit error rate (for digital systems), reading error, signal-to-noise ratio, signal duration, signal amplitude, external interference, noise floor, and reader power consumption during the reading may be assessed. The reader 10 or an upstream processor may combine the self-test reading with other diagnostic information to draw conclusions about reader 10 performance. The other diagnostic information may include temperature (internal to reader 10 and external), ambient conditions, reader 10 power draw, battery level, etc.

The embodiment of the invention has been described above and, obviously, modifications and alternations will occur to others upon reading and understanding this specification. The claims as follows are intended to include all modifications and alterations insofar as they are within the scope of the claims or the equivalent thereof.

Having thus described the invention, we claim:

1. A system for wirelessly sensing a parameter from a remote location, comprising:
   a wireless reader configured to communicate with a wireless sensor, said wireless sensor is configured to change its resonant frequency in proportion to at least one sensed parameter;
   a self-test device which emulates at least one electrical behavior of said wireless sensor in a known manner and is configured to adjust its resonant frequency to emulate said wireless sensor when placed in communication with said reader;
   wherein said system is configured to carry out a self-test such that said reader wirelessly communicates with said self-test device and obtains at least one response from said self-test device, and;
   wherein said at least one response is compared to an expected response from said self-test device, in order to assess a functional performance of said reader.

2. The system of claim 1, wherein said self-test device is powered wirelessly by said reader.

3. The system of claim 1, wherein said wireless sensor is battery powered.

4. The system of claim 1, wherein said self-test device communicates with said reader using a continuous wave signal.

5. The system of claim 1, wherein said reader is a handheld device.

6. The system of claim 1 wherein said reader is battery powered.

7. The system of claim 1, wherein said reader is placed in a standard docking station when not in use.

8. The system of claim 7, wherein said self-test device is built into said docking station.

9. The system of claim 7, wherein said docking station provides a battery charging function to said reader.

10. The system of claim 7 wherein said docking station provides a data link function to said reader.

11. The system of claim 7, wherein said self-test device is powered by said docking station.

12. The system of claim 1, wherein said self-test device is configured to change said at least one response to said reader, in order to emulate a plurality of operational states of said sensor.

13. The system of claim 1, wherein said self-test device is configured to change its at least one response to said reader in order to emulate said responses from said wireless sensor when said wireless sensor is exposed to a plurality of environmental conditions.

14. The system of claim 1, wherein said self-test device is configured to adjust its Q factor.

15. The system of claim 1, wherein said self-test device is configured to change its at least one response to said reader in order to emulate said response of said wireless sensor when said sensor is positioned relative to said reader at a plurality of Radio Frequency (RF) link distances.

16. The system of claim 1, wherein said self-test device comprises an antenna that is electrically similar to an antenna of said sensor.

17. The system of claim 2, wherein said self-test device is configured to measure power transmissions from said reader.

18. The system of claim 1, wherein said self-test device is configured to sample transmissions from said reader for analysis.

19. The system of claim 1, wherein said self-test device comprises an LC resonant tank circuit.

20. The system of claim 19, wherein said LC resonant tank circuit's resonant frequency is adjustable.

21. The system of claim 2, wherein said sensor is powered by inductive coupling.

22. The system of claim 1, wherein said comparison of said at least one response to said expected response is made by said reader.

23. The system of claim 1, wherein said comparison of said at least one response to said expected response is made by a system external to said reader.

24. The system of claim 1, wherein said assessment of a functional performance of said reader is made by said reader.

25. The system of claim 1, wherein said assessment of a functional performance of said reader is made by a system external to said reader.

26. The system of claim 25, wherein said assessment is communicated back to said reader.

27. The system of claim 1, wherein said system evaluates said comparison of said at least one response to said expected response against at least one predetermined threshold.

28. The system of claim 27, wherein said system takes action when said comparison value exceeds said predetermined threshold value.

29. The system of claim 1, wherein the self-test is initiated by at least one of the following: a circuit for measuring time interval; a real-time clock; a user input; an input from another device; a signal indicating said reader has been docked; and; a wakeup timer.

30. The system of claim 1, wherein at least one result of said assessment is displayed on a screen.

31. The system of claim 1, wherein at least one result of said assessment is communicated to an external device.

32. A method for self-testing a reader device, the method comprising:
providing a wireless reader configured to communicate with a wireless sensor, said wireless sensor configured to change is resonant frequency in proportion to at least one sensed parameter;
placing said reader in communication with a self-test device, said self-test device configured to emulate at least one electrical behavior of said wireless sensor in a known manner and is configured to adjust its resonant frequency to emulate said wireless sensor;
conducting a self-test such that said reader wirelessly communicates with said self-test device and obtains at least one response, and;
comparing said at least one response to at least one expected response from said self-test device, in order to assess a functional performance of said reader.

33. The method of claim 32, further comprising the step of powering said self-test device wirelessly by said reader.

34. The method of claim 32, further comprising the step of powering said wireless sensor with a battery.

35. The method of claim 32, wherein said self-test device communicates with said reader using a continuous wave signal.

36. The method of claim 32, further comprising the step of placing said reader in a standard docking station when not in communication with said wireless sensor.

37. The method of claim 36, wherein the step of placing said reader in communication with said self-test device includes placing said reader in a docking station such that said self-test device is built into said docking station.

38. The method of claim 37 further comprising charging a battery of said reader by placing said reader in said docking station.

39. The method of claim 37 further comprising providing a data link function to said reader from said docking station.

40. The method of claim 37 further comprising providing power from said docking station to said self-test device.

41. The method of claim 32 further comprising changing said at least one response of said self-test device to said reader in order to emulate a plurality of operational states of said sensor.

42. The method of claim 32 further comprising changing said at least one response of said self-test device to said reader in order to emulate said responses from said wireless sensor when said wireless sensor is exposed to a plurality of environmental conditions.

43. The method of claim 42 further comprising adjusting a Q factor of said self-test device.

44. The method of claim 32 further comprising changing said at least one response from said self-test device to said reader in order to emulate said response of said wireless sensor when said sensor is positioned relative said reader at a plurality of Radio Frequency (RF) link distances.

45. The method of claim 33 further comprising measuring power transmission from said reader.

46. The method of claim 32 further comprising sampling transmissions from said reader for analyzing said transmissions.

47. The method of claim 32 further comprising adjusting a resonant frequency of an LC resonant tank circuit of said self-test device.

48. The method of claim 32 further comprising assessing a functional performance of said reader; and
communicating said assessment of said functional performance of said reader to said reader.

49. The method of claim 32 further comprising evaluating said comparison of said at least one response to said expected response against at least one predetermined threshold.

50. The method of claim 49, further comprising taking action when said comparison value exceeds said predetermined threshold value.

51. The method of claim 32 further comprising initiating said self test by at least one of; a circuit for measuring time interval, a real-time clock, a user input, an input from another device, a signal indicating said reader has been docked, and a wakeup timer.

52. The method of claim 32 further comprising displaying said results of said assessment on a screen.

53. The method of claim 32 further comprising communicating said results of said assessment to an external device.

54. A system for wirelessly sensing a parameter from a remote location, said system comprising:
a wireless sensor configured to change its resonant frequency in proportion to at least one sensed parameter;
a reader configured to transmit an excitation pulse to said wireless sensor, to receive a signal from said wireless sensor in response to said excitation pulse, and to sample and hold said received signal;
a self-test device which emulates an electrical behavior of said wireless sensor in a known manner and is configured to adjust its resonant frequency to emulate said wireless sensor when placed in communication with said reader;
wherein said system is configured to carry out a self-test such that said reader wirelessly communicates with said self-test device and obtains at least one response,
wherein said at least one response is compared to at least one expected response from said self-test device, in order to assess a functional performance of said reader; and
wherein said system evaluates said comparison of said response to said expected response against at least one predetermined threshold.

55. A system for obtaining a measurement from a remote location, said system comprising:
a wireless sensor configured to change its resonant frequency in proportion to at least one sensed parameter;
a handheld, battery-powered reader configured to transmit an excitation pulse to said wireless sensor and to receive a signal from said wireless sensor in response to said excitation pulse; and
a self-test device which emulates at least one electrical behavior of said wireless sensor in a known manner and is configured to adjust its resonant frequency to emulate said wireless sensor when placed in communication with said reader;
wherein said system is configured to carry out a self-test such that said reader wirelessly transmits said excitation pulse to said self-test device and obtains at least one response;
wherein said at least one response is compared to at least one expected response from said self-test device, in order to assess a functional performance of said reader.

56. A method of obtaining a measurement from a remote location, the method comprising:
transmitting an excitation pulse to a wireless sensor;
receiving a signal from said wireless sensor in response to said excitation pulse;
generating a count signal;
adjusting the frequency of said count signal to match the frequency of said received signal;
holding said frequency of said count signal temporarily constant to ascertain the frequency of said count signal;
ascertaining the frequency of said count signal wherein said wireless sensor is configured to adjust is resonant frequency in proportion to at least one predetermined parameter;
placing said reader in communication with a self-test device during times when said reader is not in communication with said sensor, said self-test device configured to emulate at least one electrical behavior of said sensor in a known manner and is configured to adjust its resonant frequency to emulate said wireless sensor;
conducting a self-test such that said reader wirelessly communicates with said self-test device and obtains at least one response, and;
comparing said at least one response to at least one expected response from said self-test.

57. The method of claim 56 wherein said excitation pulse is a fixed frequency pulse.

58. A system for self-testing a wireless sensor reader comp rising:
a transmit circuit configured to generate an excitation pulse to cause a wireless sensor to emit a ring signal;
an antenna configured to transmit said excitation pulse and receive said ring signal;
a phase-locked loop circuit configured to receive said ring signal, said phase-locked loop circuit including a voltage-controlled oscillator configured to generate a count signal at a frequency related to said ring signal frequency;
wherein said phase-locked loop circuit is capable of being placed in a sample mode to receive said ring signal and adjust the frequency of said count signal based on the frequency of said ring signal;
further wherein said phase-locked loop circuit is capable of being placed in a hold mode to hold the frequency of said count signal constant for a length of time sufficient to determine the frequency of said count signal;
a self-test device which emulates at least one electrical behavior of said wireless sensor in a known manner and is configured to adjust its resonant frequency to emulate said wireless sensor when placed in communication with said reader;
wherein said system is configured to carry out a self-test such that said reader wirelessly communicates with said self-test device and obtains at least one response, and;
wherein said at least one response is compared to an expected response from said self-test device, in order to assess a functional performance of said reader.

* * * * *